Figure 1:
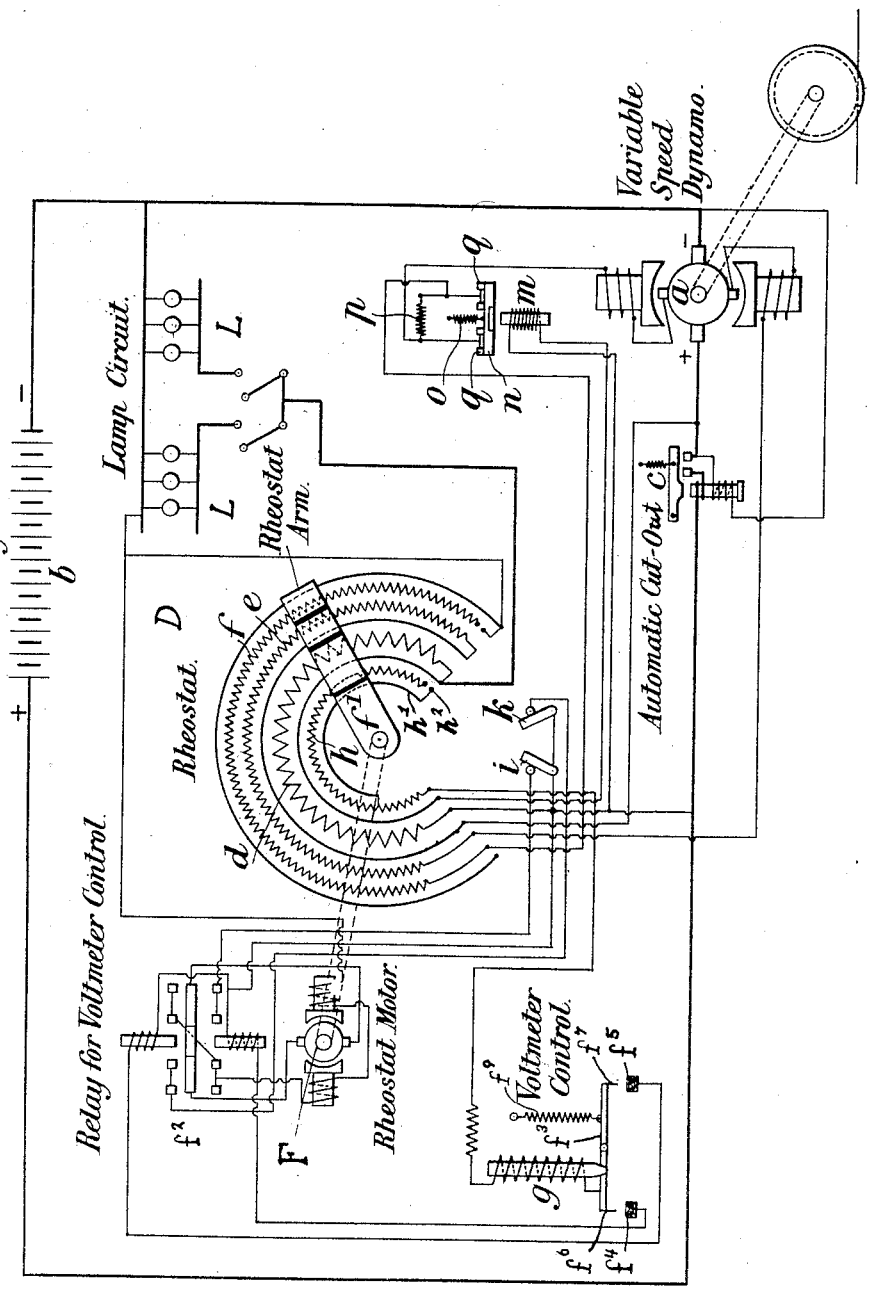

H. LEITNER.
AUTOMATIC ELECTRIC REGULATOR.
APPLICATION FILED FEB. 26, 1910.

1,040,704.

Patented Oct. 8, 1912.

2 SHEETS—SHEET 1.

UNITED STATES PATENT OFFICE.

HENRY LEITNER, OF MAYBURY, WOKING, ENGLAND.

AUTOMATIC ELECTRIC REGULATOR.

1,040,704.　　　　Specification of Letters Patent.　　Patented Oct. 8, 1912.

Application filed February 26, 1910. Serial No. 546,219.

*To all whom it may concern:*

Be it known that I, HENRY LEITNER, a subject of the King of Great Britain, residing at Maybury, Woking, Surrey, England, have invented new and useful Improvements in Automatic Electric Regulators, of which the following is a specification.

This invention relates to electric regulators and the like chiefly of the automatic type such as are described in the specifications of my former United States Patent No. 907,380 of 1908. In such regulators resistance is put in the lamp circuit in proportion to the rise of voltage in the lamp supply circuit due to rise of battery voltage in consequence of charge. It may be desirable also to diminish the output of the generator charging the cells and a convenient method of effecting this is to put resistances progressively in the dynamo field circuit. This method is particularly applicable to automatic generating sets with variable speed dynamos such as are used, for example, for train lighting. But it will be obvious that however correctly the complete system may operate within very wide limits it yet presupposes a certain normal proportion between dynamo output, size of battery and normal lamp load. If the battery and lamp load compared to the dynamo output are very greatly diminished it is almost unavoidable that the powerful generator will eventually overcharge the battery or charge it at too high a rate. Moreover, even if the dynamo be provided with an output adjuster, that is to say, a device for putting resistances in the dynamo field circuit by hand, so that the output may be brought within reasonable limits, the dynamo, on the sudden large increase of the lamp load and the decrease of the battery charge, will not again readjust itself automatically to the new conditions, so that hand regulation is open to serious objections in practice. Now, according to my present invention I overcome these objections and effect regulation automatically by utilizing the potential differences of the whole, or of different portions, of the resistance inserted in the lamp circuit to energize one or more electro-magnets which attracts or attract one or more armatures designed to short circuit in their non-attracted or "off" position resistances or the like in the field circuit of the dynamo so that these resistances are inserted in the dynamo field circuit and lessen the output of the generator, when the said armature or armatures is or are attracted.

In the case of the adaptation of my invention to a regulator such as described in the specification of my former patent above referred to any considerable rise in the lamp circuit is caused to insert by means of the regulator arm more and more resistance in that lamp circuit and also in the dynamo field circuit until eventually the potential difference across the lamp resistance will actuate the automatic output adjuster which is the subject of the present invention, whereby a resistance will be inserted in one or both of the field circuit progressive resistance scales of the regulator; this changes the whole scale value of these progressive resistances and the dynamo output, while being reduced, still continues to accommodate itself, under these new conditions, to load and voltage by the movements of the regulator arm. Should a heavy lamp load reduce the battery voltage, the said arm will go back until there is not sufficient potential difference in the lamp resistance to actuate the automatic output adjuster, whereupon by the release of its armature, the full dynamo output will be reëstablished exactly when required. The same action will take place when the lamps are switched off as then the potential difference in the lamp resistance circuit is obviously zero. As a modification, the invention would also be equally well applied to any circuit which is regulated by switching in or out of circuit regulating cells which cells may be switched in or out either automatically or by hand. In this case the potential difference across the regulating cells is utilized to effect the automatic operation of the electro-magnetic device.

To enable the invention to be fully understood I will describe it by reference to the accompanying drawing, in which:—

Figure 2:
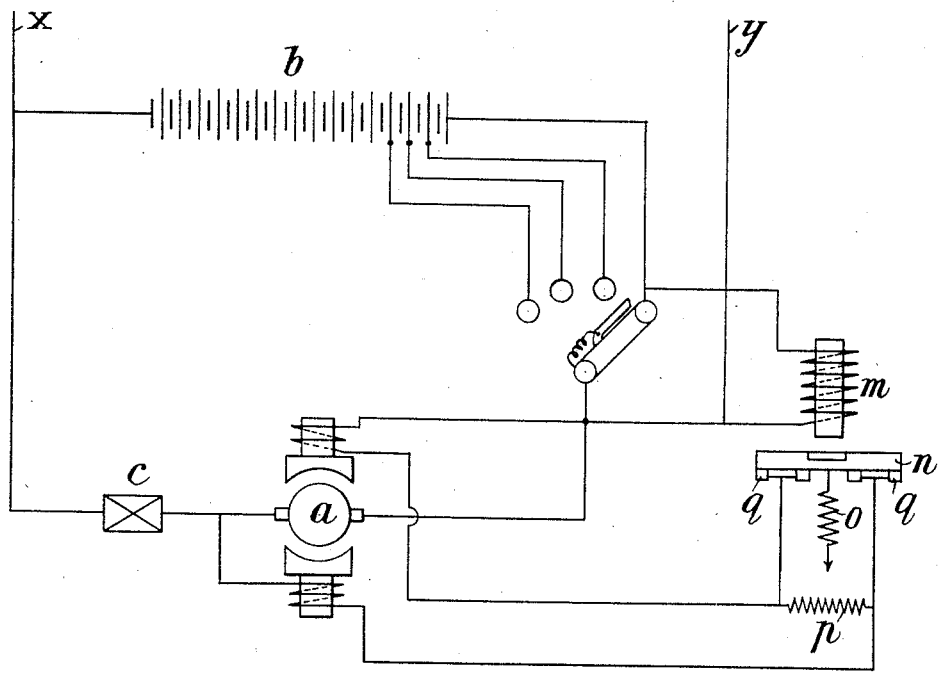

Figure 1 is a diagram illustrating a regulator such as described in my former patent above referred to provided with my improvements. Fig. 2 is a diagram illustrating the modification.

In the embodiment of my invention herein diagrammatically illustrated *a* is the dynamo, which is shown as self regulating as to variations in speed, *b* the battery of accumulators, L, L two banks of lamps, D the automatic regulator or rheostat, provided with suitable contacts, not specifically indicated, $f'$ the arm of the said rheostat, F the electric motor in operative connection with the said rheostat arm, $f^2$ the relay for controlling the said motor, $g$ the solenoid or voltmeter control in parallel with the lamps, $f^6$, $f^7$ two contacts carried on a pivoted bar, $f^3$, operated by the solenoid $g$ and a spring $f^9$, and operating in conjunction with two contacts $f^4$, $f^5$ respectively shown as mercury cups to control the direction of current to the motor F; $f$ the resistances in the shunt field of the dynamo $a$.

$h$ is a series of graduated resistances in series with the solenoid of the voltmeter control, so arranged that as the arm $f'$ of the rheostat moves clockwise the resistance is gradually increased, with the result that increasingly higher voltages are required for causing the solenoid $g$ to effect the further movement of the rheostat arm. Thus as the voltage of the charging battery increases the resistance $h$ is correspondingly raised and the output in amperes of the generator is simultaneously and gradually and proportionately reduced until the battery $b$ is fully charged when the field or fields is or are completely suppressed by the inserted resistance, and the dynamo is simultaneously cut off by any convenient automatic cut out $c$.

$d$ and $f$ are graduated resistances adapted to be put into the lamp circuit by the rheostat arm, and $e$ is a graduated resistance adapted to be put into the field circuit of the dynamo by the rheostat arm.

$i$ and $k$ are motor break switches operated by the arm $f'$ of the rheostat at the opposite ends of its arc of travel to prevent said arm from overrunning the rheostat.

The foregoing parts are constructed and operate as set forth in my said former patent and do not of themselves constitute my present invention. The operation of the entire system will be clear from the following description of my improvements therein.

The automatic cut out herein shown comprises a contact lever for connecting two contacts in the main dynamo circuit and thereby closing the circuit, the contact lever being held in open position by a spring and being actuated to close the circuit by a magnet having a coarse coil in the dynamo circuit, the circuit through which is closed by the switch, and a fine wire coil in series, connected with a separate closed dynamo circuit. As soon as the dynamo commences to generate, a current will pass through the fine wire coil of the apparatus, and when this has reached a certain strength the armature is attracted, thereby closing the contacts in the main circuit between the dynamo and the accumulators. This circuit, as shown in the drawing, passes in a series coil around the magnet, and serves to hold the armature firmly in the "on" position. When the dynamo ceases to generate, the attraction of the fine wire coil ceases, and the armature rises by the pull of the spring, thus breaking the main contacts. When the E. M. F. of the dynamo falls below that of the accumulators, there will be a reverse current through the coarse wound series coil which will help to de-magnetize the magnet and thus release the armature immediately, and before the dynamo has actually stopped.

Adjacent to a portion of the resistance $h$, I arrange a conductor, indicated in the diagram Fig. 1, at $h'$, to short circuit a portion of said resistance when the regulator arm $f'$ reaches the extreme "high" end of its travel. It will be noted in said diagram that the said conductor $h'$ is joined to the resistance, as shown, at the left hand end, and at the right hand end it terminates in a small stud $h^2$, which will come in contact with that portion of the arm $f'$ which is in contact with the resistance when the said arm reaches the "high" end of the regulator.

In the diagram Fig. 1, I have shown the voltmeter control device in a neutral position and the relay for the voltmeter control device is also shown in neutral position for convenience in tracing the circuits, and to avoid the necessity of showing these parts in both positions which they may occupy. It will be understood that in practice the circuit will be closed through one of the contacts of the voltmeter control lever and the armature of the relay will be drawn toward the magnet thereof which is located in the circuit so closed.

I will now describe my improvements.

$m$ represents the winding of the electromagnet or like device connected across the resistance $d$. The armature $n$ is normally held in the "off" position by means, for example, of the spring $o$. When in this position the resistance $p$ which is in the field circuit of the dynamo and connected to the contacts $q$ is short circuited and remains so until the potential difference across the lamp resistance $d$ causes the armature $n$ to be attracted, thus inserting the resistance $r$ into one or both (one only being shown in the drawing) of the field circuit progressive resistance scales of the regulator; this changes the whole scale value of these resistances and the dynamo output, while being reduced, still continues to accommodate itself to load and voltage by the movements of the regulator arm $f'$. Should the voltage of the battery be reduced by any means, as for example, a heavy lamp load, the voltmeter control $g$ will cause the regulator arm $f'$ to move back, until there is not sufficient potential difference across the lamp resistance $d$ to hold the armature $n$ against the spring $o$, consequently the armature $n$ is released and again short circuits the resistance *p*, thus increasing the dynamo output to the maximum for that position of the regulator arm. The same action will take place when the lamps are switched off, as then the potential difference across the lamp resistance *d* is obviously zero.

Fig. 2 shows by way of example only the invention applied to a circuit *x—y* which is regulated by switching cells in or out of circuit by hand as the voltage varies. The windings *m* are connected so as to be energized by the regulating cells only, whereby the resistance *p* is inserted in the field circuit of the dynamo only when a predetermined number of these are switched out of the main circuit. When all the regulating cells are in the main circuit the potential difference across the windings *m* is zero and consequently the armature *n* will short-circuit the field resistance *p*, thus allowing the dynamo to give its maximum output. It is obvious that the resistance *p* could be used in conjunction with a progressive field resistance as in Fig. 1, in which case the scale value of this progressive resistance would be altered whenever the instrument operated.

Claims.

1. In an electric regulator, the combination with an accumulator, a dynamo and a lamp circuit connected with the accumulator and dynamo, and regulating means for inserting resistance progressively in the lamp circuit, and to simultaneously insert resistance progressively in the dynamo field circuit, an independent resistance and an automatic electric device brought into operation when the potential difference across the lamp resistance reaches a predetermined point, to cut said independent resistance into the progressive resistance of the dynamo field circuit, to change the scale value of the said progressive resistance and enable the dynamo output, while being reduced to accommodate itself to load voltage conditions under the control of the said regulating means.

2. The combination with a variable speed dynamo, an accumulator, a lamp circuit connected with the dynamo and accumulator, progressive resistance for the lamp circuit, progressive resistance for the dynamo field circuit, a separate resistance in circuit with said progressive resistance for the dynamo field circuit, a short circuiting device for said separate resistance normally short circuiting the same, a circuit across the lamp resistance and an electric device in said circuit, constructed to operate said short circuiting device so as to place the separate resistance in circuit with the progressive resistance of the dynamo field circuit when the potential of the circuit in which said electric device is located, reaches a predetermined point.

3. The combination with a variable speed dynamo, an accumulator, a lamp circuit, a progressive resistance for the lamp circuit, a progressive resistance for the dynamo field circuit, a regulating device for simultaneously cutting said resistance in and out, of a circuit across the lamp resistance, an electro magnetic device having a coil in said circuit, an armature for said electro magnetic device, a spring normally holding said armature in " off " position, an independent resistance in circuit with the progressive resistance of the dynamo field circuit, and a normally operative short circuiting device operatively connected with said armature for short circuiting said independent resistance.

HENRY LEITNER.

Witnesses:
 FRED. J. COLLIS,
 A. ALTUTT.